United States Patent
Dauner

(10) Patent No.: US 10,016,821 B2
(45) Date of Patent: Jul. 10, 2018

(54) DEVICE FOR MACHINING EDGES

(71) Applicant: Airbus Defence and Space GmbH, Ottobrunn (DE)

(72) Inventor: Timo Dauner, München (DE)

(73) Assignee: Airbus Defence and Space GmbH (DE)

( * ) Notice: Subject to any disclaimer, the term of this patent is extended or adjusted under 35 U.S.C. 154(b) by 0 days.

(21) Appl. No.: 14/905,716

(22) PCT Filed: Jul. 17, 2014

(86) PCT No.: PCT/DE2014/000362
§ 371 (c)(1),
(2) Date: Jan. 15, 2016

(87) PCT Pub. No.: WO2015/010675
PCT Pub. Date: Jan. 29, 2015

(65) Prior Publication Data
US 2016/0167141 A1 Jun. 16, 2016

(30) Foreign Application Priority Data
Jul. 20, 2013 (DE) .................. 10 2013 012 167

(51) Int. Cl.
*B23C 3/12* (2006.01)

(52) U.S. Cl.
CPC ............. *B23C 3/126* (2013.01); *B23C 3/12* (2013.01); *B23C 2220/16* (2013.01);
(Continued)

(58) Field of Classification Search
CPC ....... B23C 3/12; B23C 3/126; B23C 2220/16; B23C 2220/20; B23C 2235/12; Y10T 409/304144; Y10T 409/30784
(Continued)

(56) References Cited

U.S. PATENT DOCUMENTS 3,196,749 A * 7/1965 Zanni .................. B23C 3/126
409/180
3,212,541 A * 10/1965 Burrows ............... B23C 3/126
144/134.1
(Continued)

FOREIGN PATENT DOCUMENTS

CH 671175 A5 * 8/1989 ............. B23C 3/126
CH 706093 A2 * 8/2013 ............... B23C 3/12
(Continued)

OTHER PUBLICATIONS

Description 9306249, translation obtained at https://worldwide.espacenet.com/ (last visited Oct. 28, 2016).*
(Continued)

*Primary Examiner* — Ryan Rufo
(74) *Attorney, Agent, or Firm* — Lerner, David, Littenberg, Krumholz & Mentlik, LLP

(57) ABSTRACT

A device for machining workpieces has a machining tool, a first workpiece-guiding element and a second workpiece-guiding element. The first workpiece-guiding element and the second workpiece-guiding element are designed to guide a workpiece, in a defined way, relative to the machining tool. The machining tool has an axis of rotation and a co-axial opening. The machining tool rotates about the axis of rotation for machining the workpiece. The first workpiece-guiding element is arranged in the opening of the machining tool co-axially to the axis of rotation.

11 Claims, 4 Drawing Sheets

(52) U.S. Cl.
CPC ...... *B23C 2220/20* (2013.01); *B23C 2230/04* (2013.01); *B23C 2255/12* (2013.01); *Y10T 409/304144* (2015.01)

(58) Field of Classification Search
USPC .......................................... 144/136.95, 154.5
See application file for complete search history.

(56) References Cited

U.S. PATENT DOCUMENTS

| | | | | |
|---|---|---|---|---|
| 3,628,579 | A | * | 12/1971 | Roche ................. B23Q 9/0028 144/134.2 |
| 4,051,880 | A | * | 10/1977 | Hestily .............. B23Q 11/0046 144/154.5 |
| 4,655,653 | A | * | 4/1987 | Hall ..................... B23Q 9/0028 409/182 |
| 4,669,923 | A | | 6/1987 | McKinney |
| 4,913,204 | A | * | 4/1990 | Moores ................ B23Q 9/0028 144/136.95 |
| 4,960,352 | A | * | 10/1990 | Kishi ....................... B23C 1/20 144/117.3 |
| 5,028,179 | A | * | 7/1991 | Grasset .................. B23C 3/126 144/154.5 |
| 5,228,489 | A | | 7/1993 | Werber et al. |
| 6,042,311 | A | * | 3/2000 | Yokoyama ............. B23C 3/126 144/136.95 |
| 7,363,950 | B2 | * | 4/2008 | Wielechowski ......... B27C 5/10 144/136.95 |
| 2003/0039517 | A1 | * | 2/2003 | Golding, III ............ B23C 3/126 407/42 |
| 2003/0165367 | A1 | * | 9/2003 | Bohringer ............... B23C 3/126 409/138 |
| 2005/0053441 | A1 | * | 3/2005 | Lowder ..................... B23C 3/12 409/180 |
| 2006/0120818 | A1 | | 6/2006 | Choi |
| 2007/0157993 | A1 | * | 7/2007 | Yoon ...................... B23P 15/28 144/371 |
| 2008/0240870 | A1 | * | 10/2008 | Rieth ..................... B23C 3/126 407/35 |

FOREIGN PATENT DOCUMENTS

| | | | | |
|---|---|---|---|---|
| DE | 9306249 U1 | * | 9/1993 | .............. B23C 3/126 |
| DE | 102004023743 A1 | * | 10/2005 | .............. B23C 3/126 |
| DE | 102007060215 A1 | | 6/2009 | |
| FR | 2702688 A1 | * | 9/1994 | .............. B23C 3/126 |
| GB | 1001329 A | * | 8/1965 | .............. B23C 3/126 |
| JP | 03-161210 A | * | 7/1991 | .............. B23C 3/12 |
| JP | 10-086011 A | * | 4/1998 | .............. B23C 3/12 |
| JP | 2000-005916 A | * | 1/2000 | .............. B23C 3/12 |
| JP | 2009-172761 A | * | 8/2009 | .............. B23C 5/20 |

OTHER PUBLICATIONS

International Search Report for Application No. PCT/DE2014/000362 dated Oct. 21, 2014.

* cited by examiner

DEVICE FOR MACHINING EDGES

CROSS-REFERENCE TO RELATED APPLICATIONS

The present application is a national phase entry under 35 U.S.C. § 371 of International Application No. PCT/DE2014/000362 filed on Jul. 17, 2014, published in German, which claims priority from German Patent Application No. 10 2013 012 167.1 filed on Jul. 20, 2013, all of which are incorporated herein by reference.

FIELD OF THE INVENTION

The present invention relates to tool technology. In particular, the present invention relates to a device for machining workpieces, with a particular focus on chamfering, smoothing, contour milling and deburring workpiece edges. Here, the workpiece may be guided on the device or the device may be guided on the workpiece manually by the operator along the workpiece contour, and the material to be removed may be machined using a separately driven and rotating machining tool.

BACKGROUND OF THE INVENTION

The machining of semi-finished workpiece edges in individual manufacturing steps is used in large semi-finished products such as cast parts, or in the small-batch production of in particular metal components in order to reduce the risk of an operator becoming injured and to prepare additional process steps. Here, the existing edge geometry is machined by the operator manually guiding the workpiece on the machining tool. This removes any burrs, for example deburring cast pieces, a defined chamfer can be produced, for example chamfering aluminium or plastics workpieces that have already been machined, or the edge can be given a complex geometry using the tool, for example by contour milling or beveling visible elements such as glass, mirrors or wood veneering. These machining options are conventionally carried out on table-top apparatuses or freestanding apparatuses, a machining tool element which projects beyond the machining table, rotates about its own axis and has geometrically defined cutting edge or cutting edges usually being used. A guiding element may in this case engage over the machining tool, projecting in an L-shape from the machining table, and may end in a rounded stop face, tangentially to the rotational axis thereof. A workpiece is guided along the workpiece geometry to be machined such that the guiding element is in position on the workpiece edge to be machined. Table-top or freestanding apparatuses having a machining table that is axially and angularly adjustable relative to the machining plane are used to set the cutting depth and the cutting angle, the machining tools used for workpiece machining being detachably connected to a drive unit only in a highly complex manner.

Here, the fact that the workpieces are taken to the machining table and are manually placed on the guiding element of the tool and/or on the work table using muscle power is usually characteristic of the machining process. In order to carry out machining, the workpiece is moved along on the guiding element by the operator. Depending on the axial setting of the machining table, the cutting tool element rotating thereunder removes material from an edge of the workpiece and thus produces the desired edge geometry. Chips that are produced either remain in the available space between the workpiece and the machining table or are sucked away.

For edges that are present on the workpiece, for example for recesses or grooves, the overarching guiding element however usually presents a limitation to the machining options owing to the size of said element and the connection to the machining table, which lies outside the tool. Particularly narrow grooves, shallow recesses, edges having short radii and acute angles, thus particularly complex geometries, often cannot be produced thereby, or can only be produced with difficulty. This may be due to the fact that the L-shaped guiding element is too high for shallow recesses and too wide for narrow grooves. In addition, machining whilst simultaneously monitoring the work result in internal machining operations that are covered by the workpiece is only possible with difficulty. In this case, the machining may be carried out without direct visual monitoring and is usually specified solely on the basis of the operator's experience. In this case, for example if there are sudden changes in direction, the back of the guiding element may come into contact with the edge to be machined and may thereby give the impression that the machining tool itself is in contact and machining is taking place. This potentially incorrect assumption and the resulting unsatisfactory machining of a workpiece is usually only eliminated by a subsequent check and by lifting up the workpiece, as is associated with said check, and this may possibly require extra work if the quality is inadequate.

Another field of application of manually handling and smoothing machined edges produced in a material-removing or sheared manner is that of repair processes for aluminium or fibre-composite shell elements in aviation. Here, damaged and non-removable structural components such as the outer skin of aircraft are manually cut out and reinforced by metal sheets or structures that are additionally attached. In order to prevent crack formation starting from the cut edges on the machined edge, the edges are smoothed. The resulting cut edges, in particular in aluminium, are deburred and smoothed using simple scraping or geometrically undefined abrasive tools, owing to the shape of the repair site and the fact that it is often difficult to access. Here, the operator draws a dragging blade along the workpiece edge, or alternatively the machining is carried out using abrasive material. In both cases, defined geometric machining of the edges is usually not possible. Furthermore, finishing work is particularly important for fibre-composite components owing to the high strength and hardness of the fibre elements. The high-strength fibres may, for example, be torn from the matrix during machining, these defects representing the start of cracks. Likewise, chips may be pressed between the individual fibre layers, and this may therefore form a starting point for delamination and possible failure of the component. It is particularly necessary to smooth these cut edges.

The publication of the German patent application DE 10 2007 060 215 A1 describes a device for machining a running edge.

BRIEF SUMMARY OF THE INVENTION

One aspect of the device according to an embodiment of the invention may be considered that of providing an improved device for machining workpieces.

According to one embodiment of the present invention, a device for machining workpieces is disclosed, comprising a machining tool, a first workpiece-guiding element, and a second workpiece-guiding element, wherein the first workpiece-guiding element and the second workpiece-guiding element are designed to guide a workpiece relative to the machining tool in a defined manner, wherein the machining tool has a rotational axis and a coaxial opening, wherein the machining tool rotates about the rotational axis for workpiece machining, and wherein the first workpiece-guiding element is arranged in the opening in the machining tool so as to be coaxial with the rotational axis.

The device according to an embodiment of the invention provides a machining tool which rotates coaxially about a central guide pin and is guided on the workpiece by the tip thereof. The device is further axially guided on the workpiece by means of a machining table that is axially and angularly adjustable relative to the machining tool. Such an embodiment allows the machining tool to be freely accessed on all sides, while the overall height is kept low at the same time. Furthermore, a device is provided according to the invention for successful, once-only machining of visible and non-visible edges, in particular with the option of machining narrow and/or shallow grooves, recesses and other, particularly complex geometries. Here, machining tools and guiding elements are lightweight and rapidly interchangeable. The device according to the invention also provides the option of optimised, hand-held machining of workpieces for use on stationary objects and operating sites that are difficult to access.

According to a further preferred embodiment of the present invention, the first workpiece-guiding element may be designed as an element or a combination of elements selected from the group consisting of a cylindrical element, a rod-shaped element and a pin-shaped element, and/or wherein the second workpiece-guiding element may be designed as a planar element, in particular as a work table having a support surface. According to a further preferred embodiment of the present invention, the first workpiece-guiding element may be designed to be static or so as to move or rotate together with the workpiece. According to a further preferred embodiment of the present invention, the radius of the first workpiece-guiding element may substantially correspond to the protrusion of the machining tool. In order to guide the device on the workpiece, it may be advantageous for a particularly stiff and short guide pin to be used as the first workpiece-guiding element. The radius of the central guide pin may be selected to be identical to the protrusion relative to the machining tool in this case. The pin may preferably project upwards out of the machining tool to such an extent that the tip transitions into the pin in a hemispherical and tangential manner. This results in a protrusion that corresponds to the radius. Embodiments having shorter protrusions are possible or desirable for other tip geometries owing to the tool or machining depth that is reduced thereby, but an excessive gap that for example may become clogged with chips should not form between the pin tip and the machining tool. Therefore, an optimum may be reached between the precision of the guidance and a low minimum machining depth of the device. The flexural rigidity can be further increased by a bearing point, which is close to the tip, between the guide pin and a hollow drive shaft of the machining tool. Here, the drive shaft is supported in a main body by further bearing points. A short free length of the guide pin and thus a high rigidity results from the guiding contact between the workpiece and the guide pin and the receiving bearing points in the device. Owing to the low overall height and the short diameter of the guide pin, it is possible for the first time to machine narrow, shallow and complex grooves and recesses on workpieces. The first workpiece-guiding element is designed to be fixed and non-rotatable or alternatively to be rotatably mounted, so that a workpiece guided on the first workpiece-guiding element may cause associated rotation in accordance with the guiding movement.

According to a further preferred embodiment of the present invention, the machining tool and/or the first workpiece-guiding element may be designed to be detachable and in particular interchangeable. Ideally, the first workpiece-guiding element, the guide pin, is detachably connected to the main body of the device. Therefore, this provides for the guide pin to be interchangeable in a manner that is geared towards the various tools. According to a further preferred embodiment of the present invention, the first workpiece-guiding element may have a change in its diameter, in particular a continuous or stepped change, along its longitudinal axis in parallel with the rotational axis. In other words, the guide pin may have a continuous or stepped change in diameter along the base-to-tip longitudinal axis. At its narrow tip, the machining tool may rotate about the guide pin. The base of the guide pin may be provided with a detachable means for connection to the main body, and above the bearing point of the drive shaft, a key face may be provided for detaching and attaching the guide pin by means of a tool. The tip, which is in guiding contact with the workpiece, may be rounded, cylindrical or may have another contour for the purpose of improved handling. The accessibility of the machining tool from all sides that is achieved by this embodiment allows simple and once-only "blind" machining of the workpiece edges without direct visual monitoring during machining.

According to a further preferred embodiment of the present invention, the machining tool may be designed as a hollow cone or may have a defined conical lateral contour, wherein, inside the hollow body, the first workpiece-guiding element is arranged so as to be substantially not in contact with the machining tool. The machining tool may thus be designed as a hollow cone or so as to have a free conical lateral contour. However, the guide pin extends axially inside the hollow body substantially without contact. The machining tool may have at least one cutting edge on the conical lateral surface, depending on the size of said machining tool and the workpiece. A person skilled in the art would find that the geometries of the conical lateral contour and of the cutting edge(s) follow from the specific application.

According to a further preferred embodiment of the present invention, the device may further comprise a drive element for the machining tool, wherein the machining tool may be detachably connected to the drive element, in particular wherein the drive element may be designed as a hollow drive shaft. A means for detachably connecting to a drive shaft and a key face for applying the tightening/releasing moment may thus be provided on the underside of the cone. By means of this connection, the tool may be driven and the arising cutting forces may be absorbed at the same time. As a result, the machining tool of the device can advantageously be rapidly changed, while at the same time safely transmitting the guiding and cutting forces.

A hollow drive shaft may be used to drive the machining tool. This may advantageously be supported in the main body by two bearing points on the outer lateral surface, and an additional bearing point may be provided inside the hollow shaft on the guide pin. The upper end of the drive shaft may comprise a corresponding means for receiving the machining tool. In order to prevent the drive shaft from rotating when mounting or detaching the machining tool, a locking mechanism may be provided, for example a manually actuatable pin projecting through the main body locks the drive shaft by means of an interlocking connection, and when the load is removed, the pin is brought back into its starting position. The lower end of the drive shaft may have a means for coupling to a drive motor. The solution to the problem of guidance for small cutting depths and narrow machining geometries is provided for the first time by this compact structure.

The guide pin and the drive shaft may be received and surrounded by a main body. Said main body has corresponding fixed/loose bearing points for absorbing the axial and radial forces arising during machining. Furthermore, a receiving portion is provided for the guide pin. A drive motor is attached to the main body either directly or by means of any connecting elements. Furthermore, a machining table is connected to the main body. On the top of the main body, the option is provided of closing this top to prevent the ingress of machining chips. The main body is designed to absorb all arising forces and represents the interface with the environment.

According to a further preferred embodiment of the present invention, the second workpiece-guiding element may be designed as a work table, wherein the work table may be designed to be movable in parallel with the rotational axis, and/or wherein the surface of the work table may be designed to be perpendicular to the rotational axis, and/or wherein the work table may be designed such that its surface normal is pivotable relative to the rotational axis such that the surface normal and the rotational axis can be arranged so as to be non-parallel. The work table can preferably be moved and locked in parallel with the axis of the machining tool. In addition, a movement mechanism is provided and one or more guiding elements are provided on the main body. In the starting position, the surface may be oriented at right angles to the axis of the machining tool. The machining tool penetrates the surface of the machining table via a continuous cut-out. This cut-out may be designed such that accumulating chips cannot penetrate the gap, or can only penetrate the gap to a limited extent, to reach the machining tool or the bearing points. The axial movability of the machining table may make it possible to change the cutting depth of the machining tool.

Furthermore, the machining table may have the option of tilting its surface normal relative to the axis of the machining tool. For this purpose, the machining table is designed to be movable about an arrangement of bearings extending at right angles to the machining axis and is provided with a means for locking at the desired angle. Therefore, it is possible to set the machining angle without changing the machining tool.

According to a further preferred embodiment of the present invention, the first workpiece-guiding element may comprise an interchangeable tip or end region, in particular an end region having a greater diameter than the first workpiece-guiding element itself. An embodiment having interchangeable tips for the guide pin is particularly advantageous. In this case, both the tips and the guide pins may comprise a detachable means for connecting the two components. Without any limitation to the following list, the tips may have the following features: a tip having a greater diameter than the guide pin itself, in order to set the cutting depth of the machining tool over the distance from the workpiece, or comprising a ball bearing-mounted guide wheel, in order to reduce the friction between the guide pin and the workpiece. The capacity for the device to be used in different machining cases is further enhanced thereby.

According to a further preferred embodiment of the present invention, the machining tool may have a defined profile geometry in order to transfer said geometry to the workpiece to be machined.

According to a further preferred embodiment of the present invention, the device may have the option of carrying away chips that accumulate. Here, openings in the work table may produce a connection to the cavity between the main body and the inside of the work table. In this cavity, a chip plate may rotate which is designed such the chips that penetrate between the machining tool and the work table are radially accelerated against an inner lateral surface of the work table/main body. Here, the chips come up against the openings and are thrown out of the device.

According to a further preferred embodiment of the present invention, the device may be designed to be handheld or stationary. The device according to the invention can be designed as a hand-held device and, without any functional limitations on the machining options, can also be designed as a table-top or freestanding apparatus. Here, the compact embodiment is intended to be replaced by a solid structure, in order to ensure the required stability and strength when machining large and heavy workpieces. For use with particularly large and heavy workpieces, an embodiment is provided which involves a movable and angularly adjustable main body, as an alternative to a work table where the work table is stationary.

In this case, the machining table may provide the function of an interface with the environment and the main body may provide the option of setting the machining angle.

BRIEF DESCRIPTION OF THE DRAWINGS

In the following, embodiments of the invention will be described in greater detail with reference to the accompanying drawings, in which.

DETAILED DESCRIPTION

Figure 1:
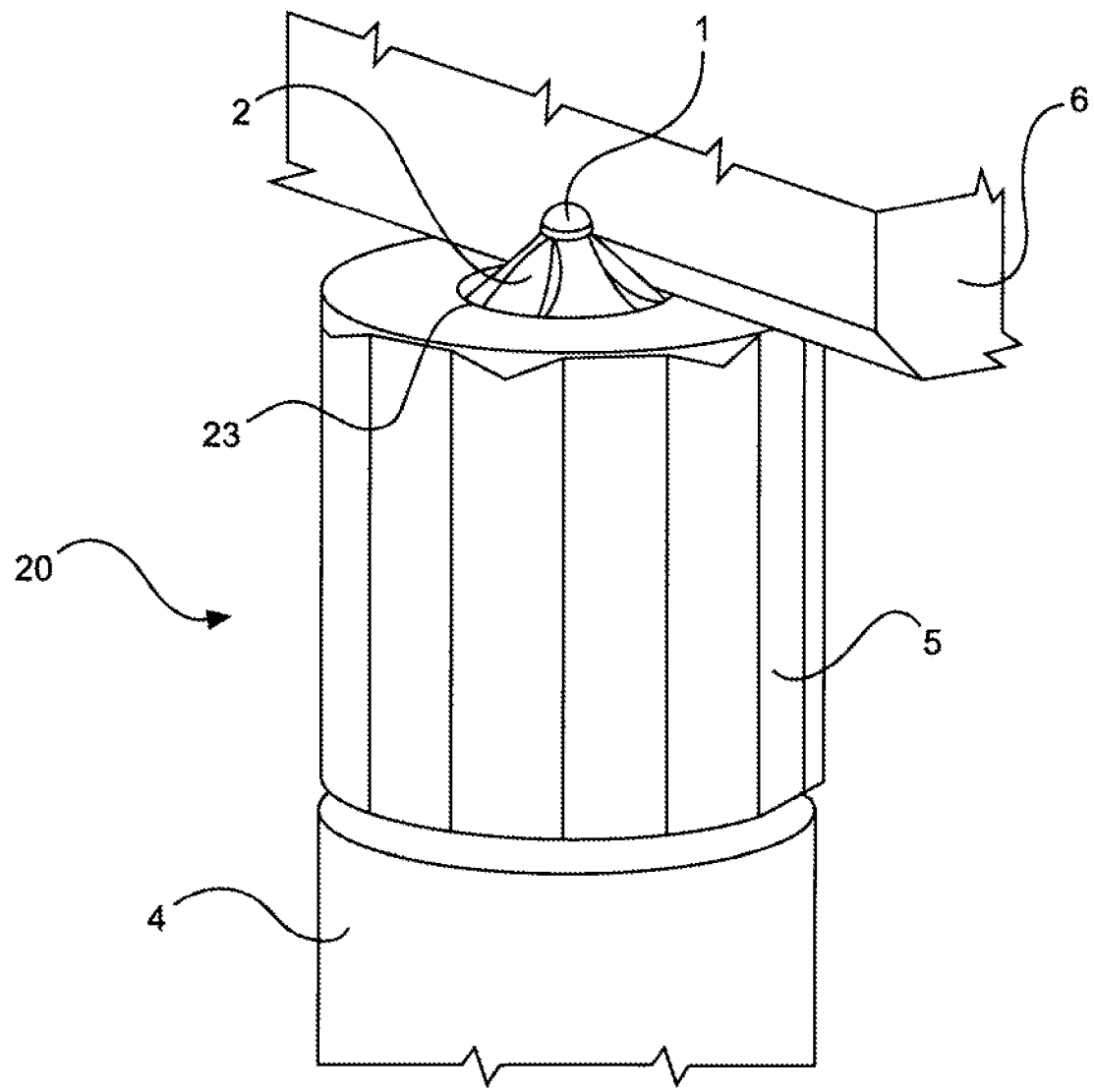
FIG. 1 shows an exemplary embodiment of an upper region of a hand-held embodiment of the device according to the present invention.
Figure 2:
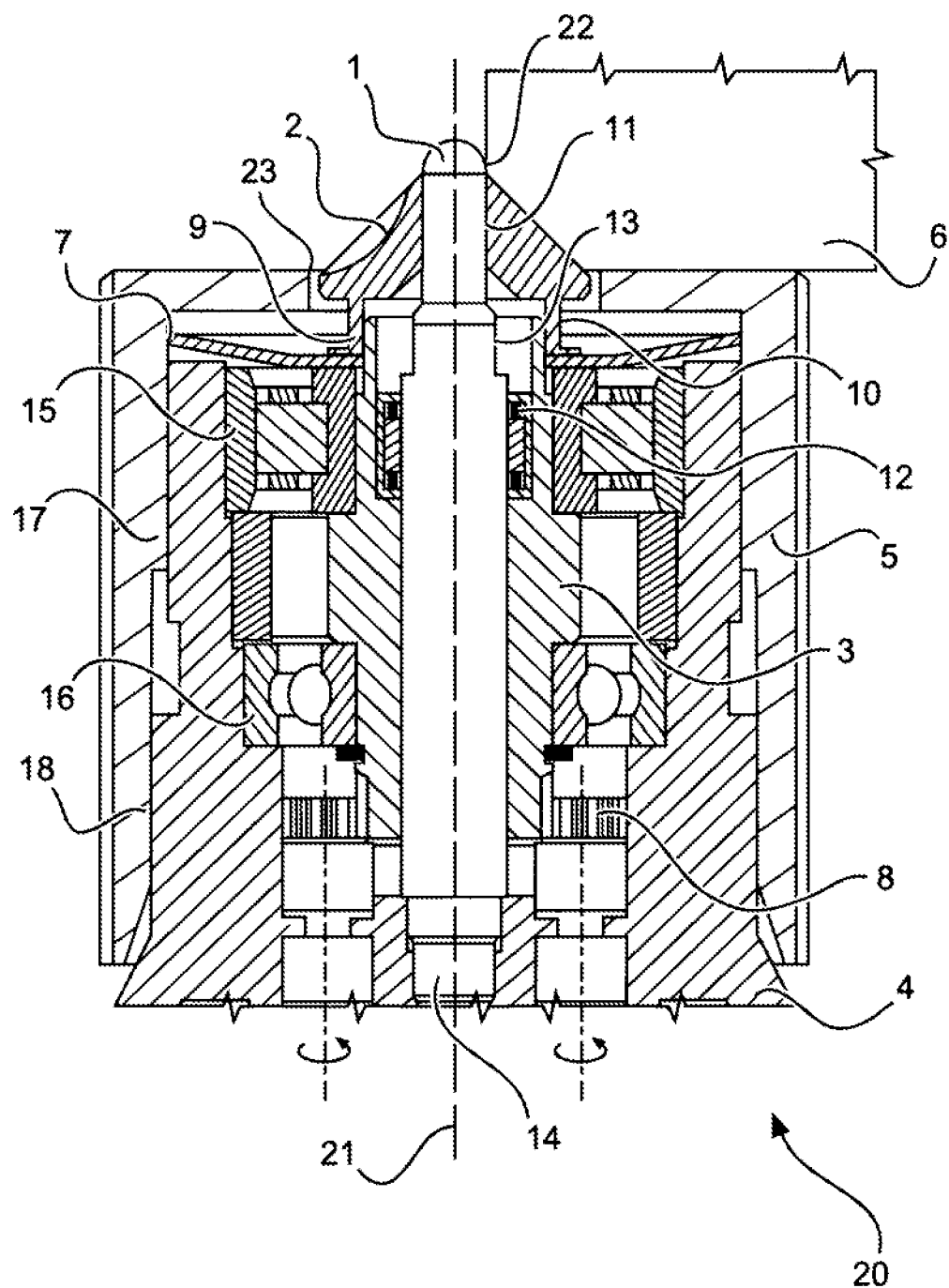
FIG. 2 is a schematic sectional view through an exemplary embodiment of the device according to the present invention.
Figure 3:
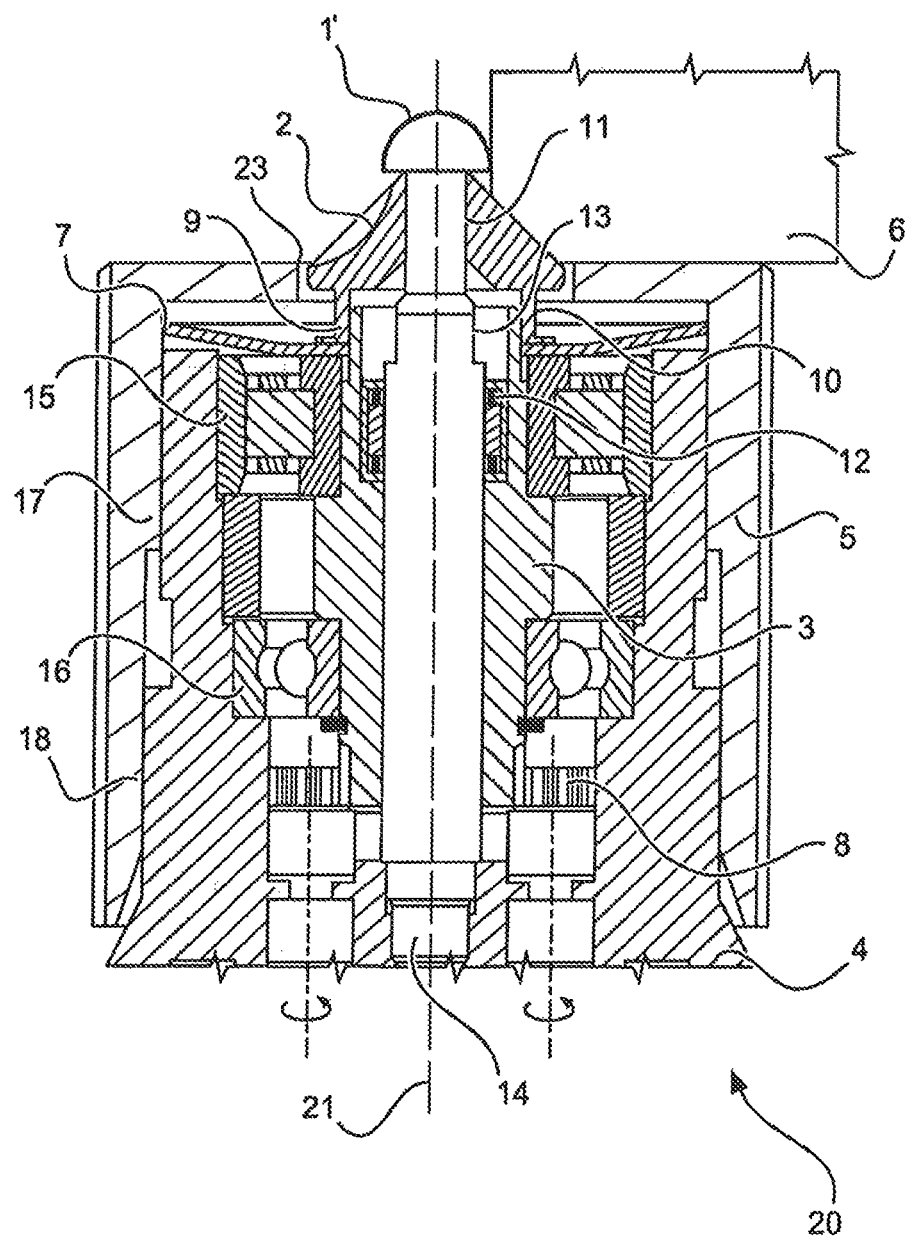
FIG. 3 is a schematic sectional view through another exemplary embodiment of the device according to the present invention.

The device according to an embodiment of the invention from FIGS. 1 and 2 comprises a first workpiece-guiding element 1, and a central and substantially rotationally symmetrical guide pin 1 which extends through and projects beyond a machining tool 2 in a coaxial hole 22. Towards its base, the diameter of the first workpiece-guiding element 1 increases continuously or in a stepped manner, or its diameter varies. Between the rounded tip (the upper, outwardly projecting end) of the first workpiece-guiding element 1 and its base (the lower, inner end), there is a key face 13 and a running surface/support surface for a bearing point, for example a needle bearing 12. At its base, the first workpiece-guiding element 1 comprises an element for detachable connection, for example a thread 14 and, if necessary, a centring means in order for it to be possible to connect the first workpiece-guiding element 1 to a main body 4 and if necessary to centre it with respect thereto. FIG. 3 illustrates another embodiment wherein the tip of the guide pin 1' has a greater diameter than the guide pin 1' itself in order to set the cutting depth of the machining tool 2 over the distance from a workpiece 6.

The machining tool 2 is conical and comprises one or more geometrically defined cutting edges on the conical lateral surface thereof. A hole 22 is provided along the rotational axis 21 which is configured as a clearance fit 11 with the first workpiece-guiding element 1. The base of the machining tool 2 comprises an element for detachable connection, for example a thread 9 and a key face 10. The thread serves to connect the machining tool 2 to a drive shaft 3.

The drive shaft 3 is rotationally symmetrical, hollow and rotatable about its longitudinal axis. The above-mentioned connecting thread 9 for the machining tool 2 is provided on the upper end of said shaft. The drive shaft 3 rotates about the first workpiece-guiding element 1, while being supported by the needle bearing 12. Furthermore, the drive shaft 3 may have a lower bearing point 16 and an upper bearing point 15 for one ball bearing in each case, which are supported in the main body 4. The drive shaft 3 has a gear unit at the base thereof for the purpose of driving. The drive may for example be designed as a planetary gear unit, three drive means 8 designed as planet gears transmitting the torque from an external motor to the drive shaft 3 and thus to the machining tool 2, for example.

The main body 4 may serve to receive the drive, the above-mentioned components and a second workpiece-guiding element 5, for example a work table. In addition, the main body 4 is cylindrical, having a recess that is open at the top. The base of this recess is penetrated by the connecting thread 14 of the first workpiece-guiding element 1 and three bearing points for the drive means 8. In the recess, there are two or more defined bearing points for receiving the upper 16 and the lower 15 ball bearing. For the purpose of guiding the work table 5, the main body 4 has a bearing point, for example a plain-bearing point 17, in the upper region of its outer lateral surface, a transmission thread 18 for axially adjusting the work table 5 and the option of locking said table.

The second workpiece-guiding element 5, a work table, is used as an axial workpiece stop of the device. Said table is axially movably connected to the main body 4 by means of the above-described plain-bearing point 17 and the transmission thread 18. By means of a rotation about the rotational axis 21, said table can be moved up and down along the main body 4. The top of the work table 5, which is for example cylindrical, is oriented so as to be normal to the rotational axis 21 of the machining tool 2 and comprises a cylindrical through-hole 23 for the machining tool 2, which hole is concentric to the rotational axis 21. When adjusting the cutting depth, this through-hole 23 receives the machining tool 2 therein. The annular gap between the machining tool 2 and the through-hole 23 is tolerated such that, at the maximum cutting depth, if possible, no chips can penetrate the space between the work table 5 and the main body 4. Recessed grips may be distributed over the outer lateral surface of the device 20 for improved handling of the device.

In order to protect the bearings 12, 15, 16 positioned in the main body 4, a chip plate 7 that rotates together with the machining tool 2 may be provided between the machining tool 2 and the drive shaft 3. Said plate covers the recess in the main body and terminates with a small gap between itself and the inner lateral surface of the work table 5 or of the main body 4. In particular at a low cutting depth, chips that penetrate are prevented from penetrating the main body 4 by the chip plate.

Figure 4:
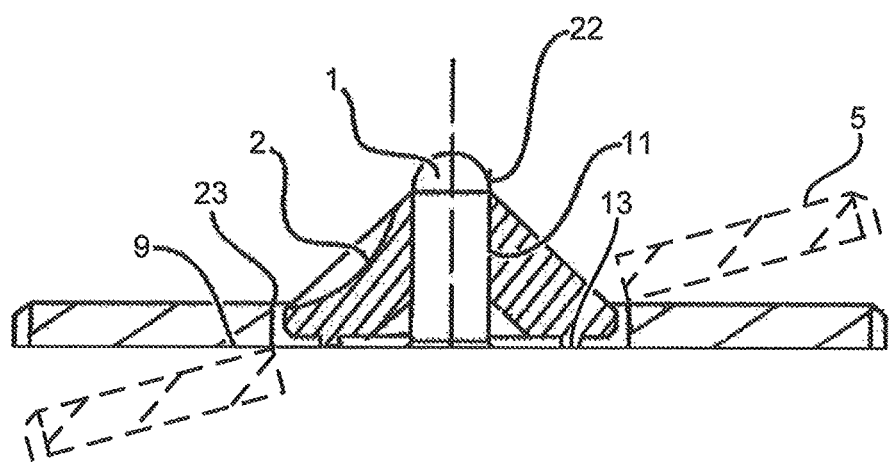
FIG. 4 is a partial schematic sectional view through another exemplary embodiment of the device according to the present invention.

FIG. 4 illustrates schematically that the second workpiece-guiding element 5 may be tilted and angularly adjusted relative to the machining tool 2 for setting a predetermine cutting angle. The surface normal of the second workpiece-guiding element 5 is pivoted relative to the rotational axis of the machining tool.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Guide pin
2 Machining tool
3 Drive shaft
4 Main body
5 Work table
6 Workpiece
7 Chip plate
8 Drive means
9 Machining-tool/drive-shaft thread
10 Tool key face
11 Guide-pin/machining-tool clearance fit
12 Guide-pin/drive-shaft needle bearing
13 Guide-pin key face
14 Guide-pin/main-body thread
15 Upper drive-shaft/main-body bearing point
16 Lower drive-shaft/main-body bearing point
17 Work-table/main-body plain-bearing point
18 Work-table/main-body transmission thread
20 Device
21 Rotational axis
22 Opening
23 Through-hole

The invention claimed is:
1. A device for machining workpieces, comprising
a machining tool;
a first workpiece-guiding element;
a second workpiece-guiding element, and
a hollow drive shaft for driving the machining tool, the hollow drive shaft being rotatable around the first workpiece-guiding element,
wherein the first workpiece-guiding element and the second workpiece-guiding element are configured to guide a workpiece relative to the machining tool in a defined manner,
wherein the machining tool has a rotational axis and a coaxial opening,
wherein the machining tool rotates about the rotational axis for workpiece machining, wherein the first workpiece-guiding element is arranged in the opening in the machining tool so as to be coaxial with the rotational axis,
wherein the first workpiece-guiding element is a pin shaped element extending completely through the hollow drive shaft,
wherein the first workpiece-guiding element is static,
wherein the second workpiece-guiding element is a planar element in the form of a work table having a support surface.

2. The device according to the claim 1,
wherein the first workpiece-guiding element is an element selected from the group consisting of a cylindrical element and a rod-shaped element, or a combination thereof.

3. The device according to claim 1, wherein at least one of the machining tool and the first workpiece-guiding element is configured to be detachable and interchangeable.

4. The device according to claim 1,
wherein the first workpiece-guiding element has a change in a diameter thereof, along a longitudinal axis thereof in parallel with the rotational axis.

5. The device according to claim 1,
wherein the machining tool is configured as a hollow cone or has a defined conical lateral contour,
wherein the first workpiece-guiding element is arranged so as to be substantially not in contact with the machining tool.

6. The device according to claim 1, the device further comprising:
wherein the machining tool is detachably connected to the hollow drive shaft.

7. The device according to claim 6,
wherein the work table is movable in parallel with the rotational axis, and/or
wherein the surface of the work table is perpendicular to the rotational axis.

8. The device according to claim 1,
wherein the first workpiece-guiding element comprises an interchangeable tip or end region having a greater diameter than the first workpiece-guiding element.

9. The device according to claim 1,
wherein the machining tool has a defined profile geometry to transfer said geometry to the workpiece.

10. The device according to claim 1,
wherein the device has a discharge for carrying away chips that accumulate.

11. The device according to claim 1,
wherein the device is configured to be hand-held or stationary.

* * * * *